(12) United States Patent
Asao et al.

(10) Patent No.: US 6,573,631 B2
(45) Date of Patent: Jun. 3, 2003

(54) AUTOMOTIVE ALTERNATOR

(75) Inventors: Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/265,777

(22) Filed: Oct. 8, 2002

(65) Prior Publication Data

US 2003/0030341 A1 Feb. 13, 2003

Related U.S. Application Data

(62) Division of application No. 09/839,173, filed on Apr. 23, 2001.

(30) Foreign Application Priority Data

Oct. 17, 2000 (JP) ......................................... 2000-316514

(51) Int. Cl.[7] .................................................. H02K 3/48
(52) U.S. Cl. ......................... 310/214; 310/90; 310/254
(58) Field of Search ................................. 310/214, 254, 310/258, 68 D, 90, 89; 384/101, 102, 539, 255, 537

(56) References Cited

U.S. PATENT DOCUMENTS

| 4,739,204 A | | 4/1988 | Kitamura et al. |
| 4,849,665 A | | 7/1989 | Kitamura et al. |
| 5,272,403 A | * | 12/1993 | New .......................... 310/90.5 |
| 5,424,600 A | | 6/1995 | Ishikawa et al. |
| 5,785,433 A | | 7/1998 | Takahashi et al. |
| 6,114,783 A | | 9/2000 | Asao |

FOREIGN PATENT DOCUMENTS

| GB | 2 068 479 A | 1/1980 |
| JP | 61-52134 | 3/1986 |
| JP | 1-34549 | 10/1989 |
| JP | 5-22897 | 1/1993 |
| JP | 7-227058 | 8/1995 |
| JP | 8-2162 | 1/1996 |

* cited by examiner

Primary Examiner—Thanh Lam
(74) Attorney, Agent, or Firm—Sughrue Mion, PLLC

(57) ABSTRACT

An outboard bearing is constituted by a multi-row bearing having one inner ring and one outer ring, a plurality of ball tracks disposed axially between the inner ring and the outer ring, and a plurality of balls disposed in each of the ball tracks. A rectifier is disposed in an outboard bracket on an outer circumferential side of an outboard bearing box, and a ventilation aperture is bored through the outboard bracket on an outer circumferential side of the outboard bearing box.

11 Claims, 9 Drawing Sheets

AUTOMOTIVE ALTERNATOR

This is a divisional of application Ser. No. 09/839,173 filed Apr. 23, 2001; the disclosure of which is incorporated herein by reference.

This application is based on Application No. 2000-316514, filed in Japan on Oct. 17, 2000, the contents of which are hereby incorporated by reference.

BACKGROUND OF THE INVENTION

1. Field of the Invention

The present invention relates to an automotive alternator, and in particular, relates to an outboard bearing construction for supporting a rotor.

2. Description of the Related Art

As the output of automotive alternators has increased, enlargement of rotors and increases in interior temperature have been promoted, requiring size reductions and high bearing reliability.

FIG. 13 is a longitudinal section of a conventional automotive alternator.

In FIG. 13, an inboard bracket 1 and an outboard bracket 2 are made of aluminum, formed into bowl shapes, and are fastened together by fastening bolts and nuts (not shown) with open portions of the bowl shapes facing each other. Cylindrical inboard and outboard bearing boxes 1a and 2a are formed integrally in central portions of end surfaces of the brackets 1 and 2. In addition, inboard and outboard ventilation apertures 1b and 2b are bored through the brackets 1 and 2 at outer circumferential portions of the bearing boxes 1a and 2a.

A shaft 3 is rotatably supported in the brackets 1 and 2 by means of inboard and outboard bearings 4 and 5 disposed inside the bearing boxes 1a and 2a. A Lundell-type rotor 6 is fixed to the shaft 3 and disposed rotatably inside the brackets 1 and 2. In addition, a stator 7 is disposed with a first and second end thereof supported by the brackets 1 and 2 so as to surround the rotor 6.

Slip rings 8 for supplying field current to a field winding in the rotor 6 are fixed to an outboard end of the shaft 3, and a pair of brushes 9 are housed inside a brush holder 10 disposed inside the brackets 1 and 2 so as to slide in contact with the slip rings 8.

A pulley 11 and an external fan 12 are fixed to an inboard end portion of the shaft 3, and in addition, a rectifier 13 electrically connected to the stator 7 for converting alternating current generated in the stator 7 into direct current is mounted inside the outboard bracket 2.

In conventional automotive alternators constructed in this manner, an electric current is supplied from a battery (not shown) through the brushes 9 and the slip rings 8 to the field winding in the rotor 6, generating magnetic flux. Magnetic poles are generated by this magnetic flux in claw-shaped magnetic poles on the rotor 6. At the same time, rotational torque from an engine is transmitted through a belt (not shown) and the pulley 11 to the shaft 3, rotating the rotor 6. Thus, a rotating magnetic field is applied to a stator winding 7a, generating an electromotive force in the stator winding 7a. This alternating-current electromotive force passes through the rectifier 13 and is converted into direct current, charging the battery.

The external fan 2 is rotated and driven together with the rotation of the shaft 3, forming a cooling air flow in which external air flows in through the outboard ventilation apertures 2b, flows through the inside of the brackets 1 and 2, and is expelled through the inboard ventilation aperture 1b, cooling heat-generating parts such as the stator 7, the rotor 6, the rectifier 13, and a voltage regulator (not shown).

Now, as shown in FIG. 14, the outboard bearing 5 is constituted by a single-row bearing having a cylindrical inner ring 15 and a cylindrical outer ring 16, a ball track 17 disposed between the inner ring 15 and the outer ring 16, and a plurality of balls 18 disposed in the ball track 17. The inner ring 15 is fixed to the shaft 3, and the outer ring 16 is fixed to the outboard bearing box 2a.

Thus, rotational torque from the engine is transmitted through the belt and the pulley 11 to the shaft 3, and the inner ring 15, which is fixed to the shaft 3, is rotated and driven with the shaft 3. A radial load due to tension applied to the belt is transmitted through the plurality of balls 18 to the outer ring 16. A load due to the weight of the rotor 6 is also transmitted through the plurality of balls 18 to the outer ring 16. By passing through the balls 18, these loads are applied to the outer ring 16 as vibrating loads, repeatedly giving rise to warping in the outer ring 16. Thus, one problem has been that fatigue failure occurs in the inner ring 15, the outer ring 16, and the balls 18, reducing the life of the outboard bearing 5.

In order to solve this problem, countermeasures have been taken to raise outer-ring rigidity by increasing the diameter of the bearing, substituting a bearing having a large load capacity, or thickening the wall of the outer ring. However, these countermeasures involve increasing the diameter of the outboard bearing 5, in other words, increasing the diameter of the outboard bearing box 2a, thereby reducing the size of the outboard ventilation apertures 2b. Similarly, the size of the rectifier 13 is also be reduced due to a necessity to ensure electrical insulation distance between the outboard bearing box 2a and the rectifier 13.

If the size of the outboard ventilation apertures 2b is reduced, the cooling air flow rate cannot be ensured, making the cooling of heat-generating parts such as the rotor 6, the stator 7, and the rectifier 13 insufficient, and if the size of the rectifier 13 is reduced, the area of a heat sink on the rectifier is reduced, making the cooling of the rectifier 13 insufficient, and as a result, the temperature of the automotive alternator rises, giving rise to reduced output and a deterioration in the life of component parts due to heat degradation.

Another countermeasure has been proposed in which the outboard bearing is constructed by lining up two single-row bearings, preventing fatigue failure by dividing the load in two. However, in that case, radial clearance in the two single-row bearings may differ, making the shared load in the two single-row bearings unbalanced, and a problem has been that bearing life is reduced.

Moreover, the inboard bearing 4 is constituted by a single-row bearing in a similar manner to the outboard bearing 5, but because the heat-generating parts such as the rectifier 13 and the voltage regulator are disposed at the outboard bracket 2 end, there is ample clear space on the outer circumferential side of the inboard bearing 4, and it is not necessary to ensure electrical insulation distance between a bearing box and a rectifier. Thus, it is possible to adopt a bearing having enlarged outside diameter, load capacity, or outer-ring wall thickness for the inboard bearing 4. Consequently, in an automotive alternator, countermeasures against fatigue failure are more important in the outboard bearing 5, which is where the heat-generating parts such as the rectifier 13 and the voltage regulator are disposed.

In conventional automotive alternators, because the outboard bearing 5 is constituted by a single-row bearing, one problem has been that warping is applied repeatedly, giving rise to fatigue failure in the outboard bearing 5, thereby reducing bearing life.

Fatigue failure in the outboard bearing 5 can be suppressed by adopting countermeasures in which rigidity is raised by increasing the diameter or the load capacity of the outboard bearing 5, or by thickening the wall of the outer ring. However, such countermeasures lead to reductions in the size of the outboard ventilation apertures 2b and the rectifier 13, increasing the temperature of the automotive alternator, and another problem has been that these countermeasures give rise to reduced output and a deterioration in the life of component parts due to heat degradation.

SUMMARY OF THE INVENTION

The present invention aims to solve the above problems and an object of the present invention is to provide an automotive alternator enabling the suppression of reductions in output and deterioration in working life as a result of temperature increases in the alternator by constituting an outboard bearing by a multi-row bearing having one inner ring and one outer ring, a plurality of ball tracks disposed axially between the inner ring and the outer ring, and a plurality of balls disposed in each of the ball tracks, thereby distributing the load bearing on the outer ring plurally in an axial direction, improving load-bearing properties without increasing the size of the outboard bearing, and enabling the size of the outboard bearing to be reduced while ensuring the durability thereof.

In order to achieve the above object, according to one aspect of the present invention, there is provided an automotive alternator including:

an inboard bracket formed in a bowl shape having a cylindrical inboard bearing box in a central portion of an end surface, and an outboard bracket formed in a bowl shape having a cylindrical outboard bearing box in a central portion of an end surface, the brackets being joined with open portions of the bowl shapes facing each other;

a shaft rotatably supported in the inboard and outboard brackets by means of inboard and outboard bearings disposed inside the inboard and outboard bearing boxes;

a pulley fixed to an inboard end portion of the shaft;

a stator disposed such that first and second ends thereof are supported in the inboard and outboard brackets;

a rotor fixed to the shaft, the rotor being disposed radially inside the stator;

a rectifier disposed in the outboard bracket on an outer circumferential side of the outboard bearing box; and a heat exchange portion for dissipating heat generated in the rectifier, wherein the outboard bearing is constituted by a multi-row bearing having one inner ring and one outer ring, a plurality of ball tracks disposed axially between the inner ring and the outer ring, and a plurality of balls disposed in each of the ball tracks.

According to another aspect of the present invention, there is provided an automotive alternator including:

an inboard bracket formed in a bowl shape having a cylindrical inboard bearing box in a central portion of an end surface, and an outboard bracket formed in a bowl shape having a cylindrical outboard bearing box in a central portion of an end surface, the brackets being joined with open portions of the bowl shapes facing each other;

a shaft rotatably supported in the inboard and outboard brackets by means of inboard and outboard bearings disposed inside the inboard and outboard bearing boxes;

a pulley fixed to an inboard end portion of the shaft;

a stator disposed such that first and second ends thereof are supported in the inboard and outboard brackets;

a rotor fixed to the shaft, the rotor being disposed radially inside the stator;

a rectifier disposed in the outboard bracket on an outer circumferential side of the outboard bearing box; and a ventilation aperture bored through the outboard bracket on an outer circumferential side of the outboard bearing box, the automotive alternator being constructed such that the rectifier is cooled by allowing air to flow through the ventilation aperture, wherein the outboard bearing is constituted by a multi-row bearing having one inner ring and one outer ring, a plurality of ball tracks disposed axially between the inner ring and the outer ring, and a plurality of balls disposed in each of the ball tracks.

The rectifier may be constructed in an arc shape having a central angle of 180 degrees or more and may be disposed on a common axis with the outboard bearing so as to overlap the outboard bearing in a radial direction, and the ventilation aperture may be bored through the outboard bracket so as to open in an arc shape for half a circumference or more in a circumferential direction facing the rectifier.

Slip rings for supplying a field current to a field winding in the rotor may be disposed at an outboard end of the shaft, a diameter of the multi-row bearing and a diameter of the slip rings being constructed so as to be substantially equal.

The shaft may be supported in the multi-row bearing such that an outboard end surface of the shaft is positioned between an outboard end surface of the multi-row bearing and a center line of an outermost ball track at the outboard end.

A creep-preventing member may be disposed on an outer circumferential surface of the outer ring of the multi-row bearing facing the ball tracks.

The multi-row bearing may have two ball tracks, and the creep-preventing member may be formed into ring-shaped bodies having a width which is less than or equal to a diameter of the balls disposed in the ball tracks, the ring-shaped bodies being disposed on an outer circumferential surface of the outer ring facing each of the ball tracks such that width-direction center lines of the ring-shaped bodies are offset towards end surfaces of the multi-row bearing relative to center lines of the ball tracks.

The outboard bracket may be made of a metal, and the creep-preventing member may be made of a resin.

A heat dissipation means may be disposed in the outboard bracket.

DETAILED DESCRIPTION OF THE PREFERRED EMBODIMENTS

The preferred embodiments of the present invention will now be explained with reference to the drawings.

Embodiment 1

Figure 1:
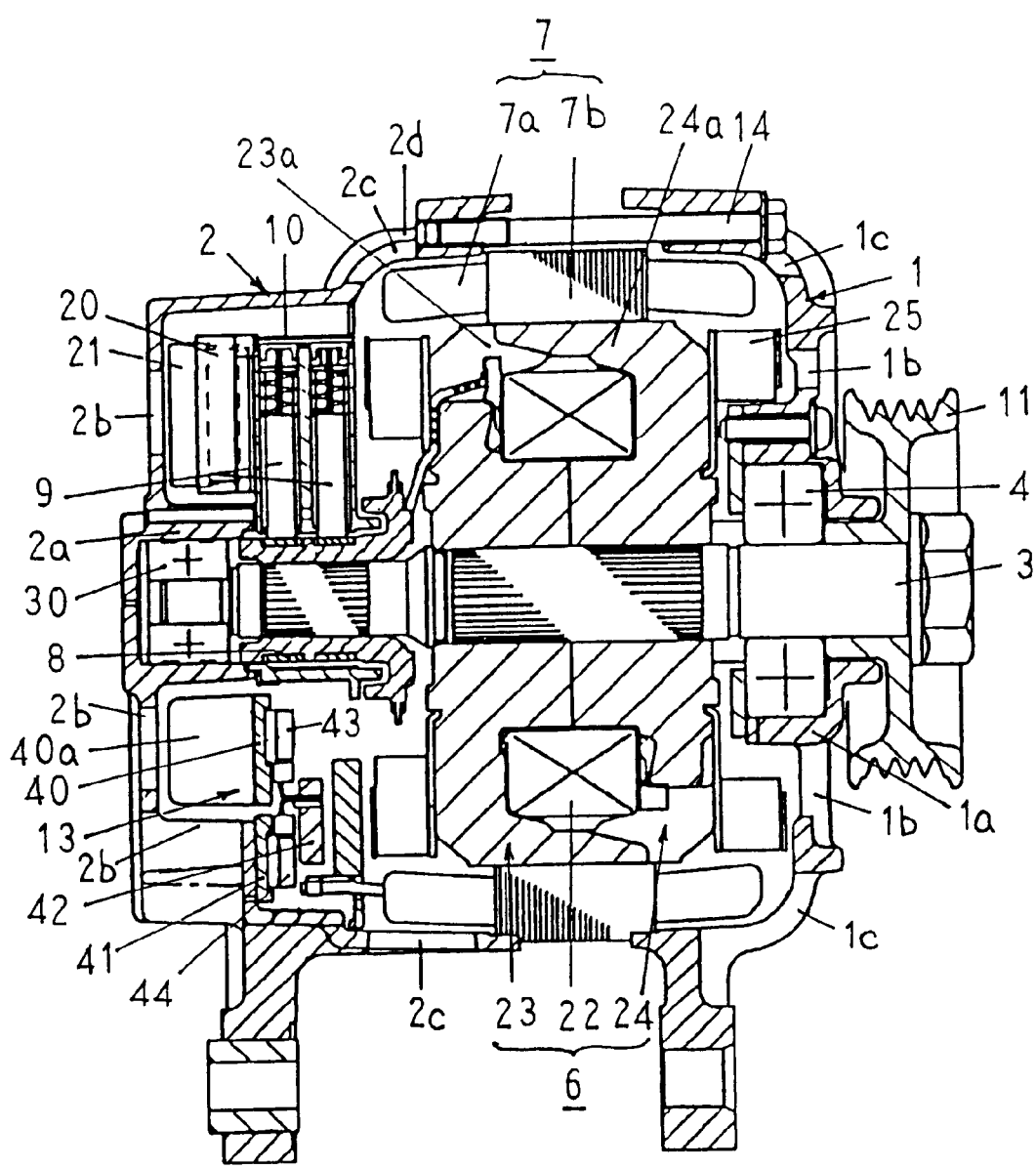
FIG. 1 is a longitudinal section of an automotive alternator according to Embodiment 1 of the present invention.
Figure 2:
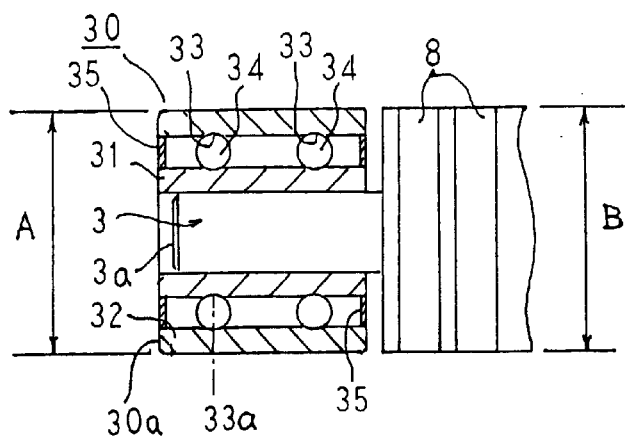
FIG. 2 is a longitudinal section of an outboard bearing in the automotive alternator according to Embodiment 1 of the present invention.
Figure 3:
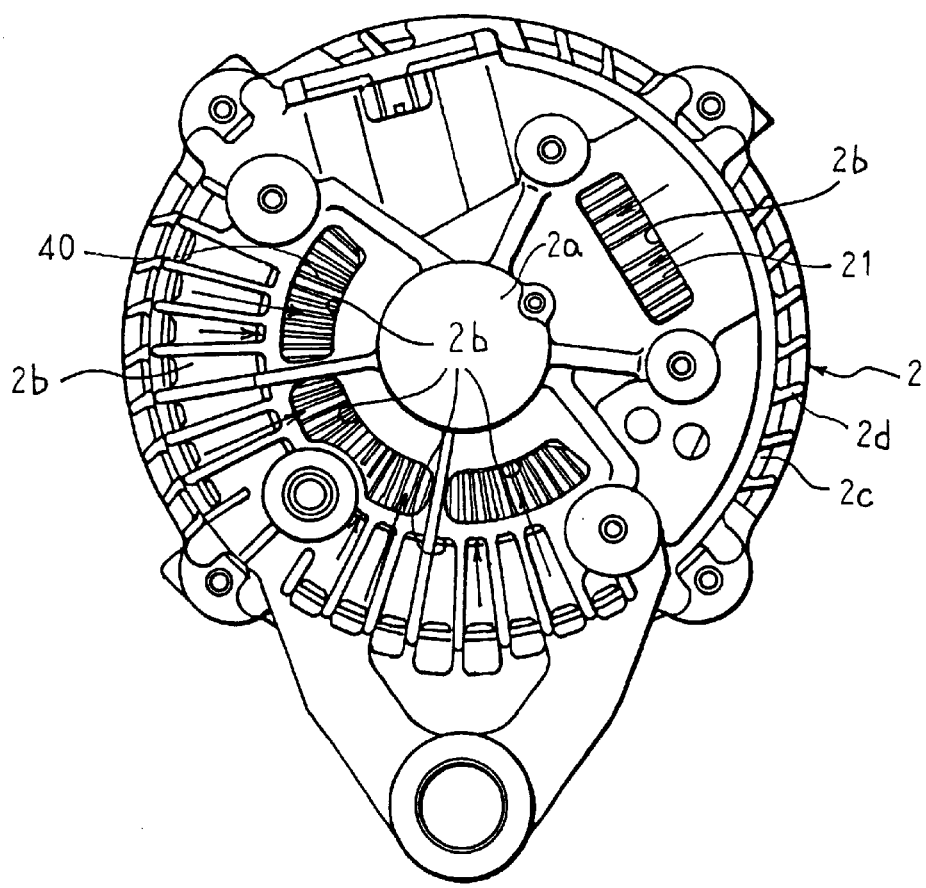
FIG. 3 is an outboard end elevation of the automotive alternator according to Embodiment 1 of the present invention.
Figure 4:
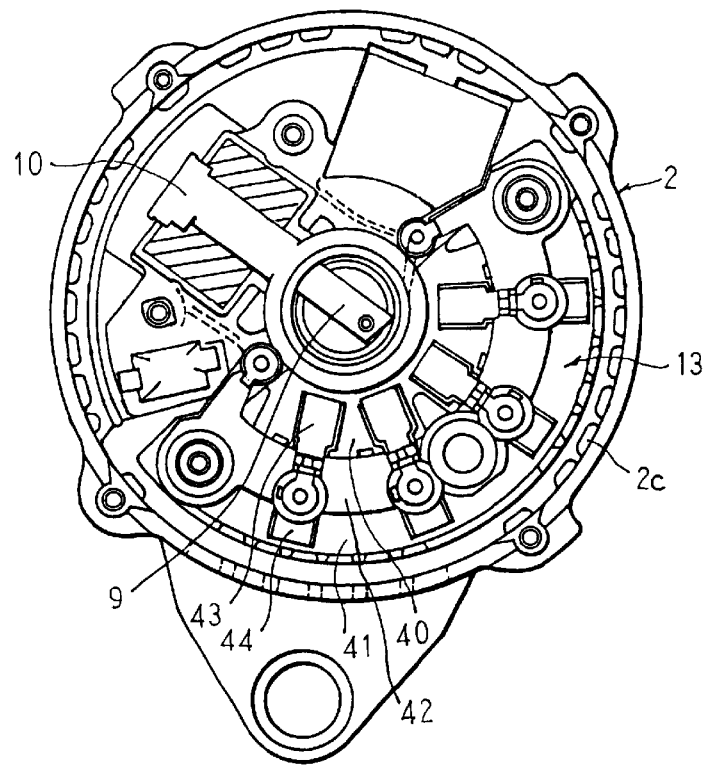
FIG. 4 is an interior view of an outboard end of the automotive alternator according to Embodiment 1 of the present invention.
Figure 5:
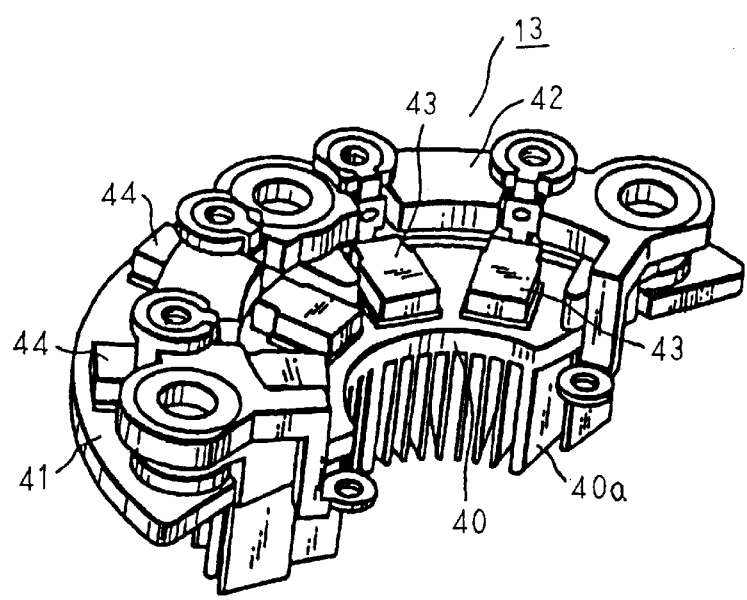
FIG. 5 is a perspective of a rectifier used in the automotive alternator according to Embodiment 1 of the present invention.

FIG. 1 is a longitudinal section of an automotive alternator, FIG. 2 is a longitudinal section of an outboard bearing in the automotive alternator shown in FIG. 1, FIG. 3 is an outboard end elevation of the automotive alternator shown in FIG. 1, FIG. 4 is an interior view of an outboard end of the automotive alternator shown in FIG. 1, and FIG. 5 is a perspective of a rectifier used in the automotive alternator shown in FIG. 1.

In FIG. 1, an inboard bracket 1 and an outboard bracket 2 are made of aluminum, formed into bowl shapes, and are fastened together by fastening bolts 14 with open portions of the bowl shapes facing each other. Cylindrical inboard and outboard bearing boxes 1a and 2a are formed integrally in central portions of end surfaces of the brackets 1 and 2. First inboard and outboard ventilation apertures 1b and 2b are bored through the brackets 1 and 2 at outer circumferential portions of the bearing boxes 1a and 2a, second inboard and outboard ventilation apertures 1c and 2c are bored through side surface edge portions of the brackets 1 and 2, and in addition, heat-dissipating ribs 2d functioning as a heat dissipation means are disposed on the side surface edge portions of the brackets 1 and 2.

A shaft 3 is rotatably supported in the brackets 1 and 2 by means of inboard and outboard bearings 4 and 30 disposed inside the bearing boxes 1a and 2a. A Lundell-type rotor 6 is fixed to the shaft 3 and disposed rotatably inside the brackets 1 and 2. In addition, a stator 7 is disposed with a first and second end of a stator core 7b supported by the brackets 1 and 2 so as to surround the rotor 6.

Slip rings 8 for supplying field current to a field winding 22 in the rotor 6 are fixed to an outboard end of the shaft 3, and a pair of brushes 9 are housed inside a brush holder 10 disposed inside the brackets 1 and 2 so as to slide in contact with the slip rings 8.

A pulley 11 is fixed to an inboard end portion of the shaft 3, enabling rotational torque from an engine to be transmitted to the shaft 3 through a belt (not shown).

A voltage regulator 20 for adjusting the magnitude of an alternating voltage generated in the stator 7 is fixed by adhesive to a regulator heat sink 21 functioning as a heat exchange portion fitted onto the brush holder 10. In addition, a rectifier 13 which is electrically connected to the stator 7 and converts the alternating current generated in the stator 7 into direct current is mounted inside the outboard bracket 2.

The rotor 6 is constituted by: a field winding 22, which generates magnetic flux when a current is passed therethrough; and a pair of first and second pole cores 23 and 24 disposed so as to cover the field winding 22, magnetic poles being formed in the pair of first and second pole cores 23 and 24 by the magnetic flux generated in the field winding 22. The pair of first and second pole cores 23 and 24 are made of iron, a plurality of first and second claw-shaped magnetic poles 23a and 24a are disposed on outer circumferential edge portions thereof at even pitch in a circumferential direction so as to project axially, and the pair of first and second pole cores 23 and 24 are fixed to the shaft 3 facing each other such that the first and second claw-shaped magnetic poles 23a and 24a intermesh. In addition, internal fans 25 are fixed to first and second axial ends of the rotor 6.

The outboard bearing 30 is constituted by a multi-row bearing having: a cylindrical inner ring 31 and a cylindrical outer ring 32 forming a pair composed of carbon steel; two ball tracks 33 disposed axially between the inner ring 31 and the outer ring 32; and a plurality of balls 34 disposed in each of the ball tracks 33. Seals 35 are disposed at first and second ends of a space between the inner ring 31 and the outer ring 32, and lubricating oil is sealed in between the seals 35. The inner ring 31 is fixed to the shaft 3, and the outer ring 32 is fixed to the outboard bearing box 2a. At this time, an outboard end surface 3a of the shaft 3 is positioned between an outboard end surface 30a of the outboard bearing 30 and a center line 33a of an outermost ball track 33 at the outboard end. A diameter A of the outer ring 32 of the outboard bearing 30 generally matches a diameter B of the slip rings 8.

As shown in FIG. 5, the rectifier 13 is constructed by disposing arc-shaped positive- and negative-side heat sinks 40 and 41 concentrically such that main surfaces thereof are positioned in a common plane, disposing positive- and negative-side diodes 43 and 44 on the main surfaces of the positive- and negative-side heat sinks 40 and 41 so as to align with each other, and additionally disposing an arc-shaped circuit board 42 on top of the positive- and negative-side heat sinks 40 and 41 so as to sandwich the positive- and negative-side diodes 43 and 44. The rectifier 13 is disposed on a common axis with the shaft 3, and is secured to the outboard bracket 2 such that a back surface (a surface on the opposite side from a main surface) of the heat sink 41 is in close contact with an inner wall surface of the outboard bracket 2.

Here, the main surfaces of the positive- and negative-side heat sinks 40 and 41 are perpendicular to the axis of the shaft 3. Heat-dissipating fins 40a are disposed so as to stand in a radial pattern on a back surface of the positive-side heat sink 40. Moreover, the positive- and negative-side heat sinks 40 and 41 constitute a heat exchange portion for dissipating heat generated in the diodes 43 and 44.

Moreover, as shown in FIG. 4, the brush holder 10 and the rectifier 13 are disposed inside the outboard bracket 2 so as to surround the shaft 3, and the voltage regulator 20, the regulator heat sink 21, and the rectifier 13 overlap the outboard bearing 30 in a radial direction. Furthermore, as shown in FIG. 3, a portion of the first outboard ventilation apertures 2b is bored through the outboard bracket 2 so as to face the regulator heat sink 21 and the positive-side heat sink 40.

In the automotive alternator constructed in this manner, electric current is supplied from a battery (not shown) through the brushes 9 and the slip rings 8 to the field coil 22 of the rotor 6, generating magnetic flux. The claw-shaped magnetic poles 23a of the first pole core 23 are magnetized with south-seeking (S) poles by this magnetic flux, and the claw-shaped magnetic poles 24a of the second pole core 24 are magnetized with north-seeking (N) poles. At the same time, the rotational torque from the engine is transmitted through the belt (not shown) and the pulley 11 to the shaft 3, rotating the rotor 6. Thus, a rotating magnetic field is applied to a stator winding 7a, generating electromotive force in the stator winding 7a. This alternating electromotive force passes through the rectifier 13 and is converted into direct current, the output voltage thereof is adjusted by the voltage regulator 20, and the battery is recharged.

At the inboard end, the internal fan 25 is rotated and driven together with the rotation of the shaft 3, and external air flows into the inboard bracket 1 through the first inboard ventilation apertures 1b, is deflected centrifugally by the internal fan 25, cools first coil end of the stator winding 7a, and is then expelled through the second inboard ventilation apertures 1c.

At the same time, as shown in FIG. 3, at the outboard end, the internal fan 25 is rotated and driven together with the rotation of the shaft 3, and external air flows into the outboard bracket 2 through the first outboard ventilation apertures 2b, and flows radially inwards along the positive-side heat sink 40 of the rectifier 13 and the regulator heat sink 21 on the voltage regulator 20. Thus, the heat generated in the positive-side diodes 43 and the voltage regulator 20 is dissipated from the positive-side heat sink 40 and the regulator heat sink 21. The air then flows between the brush holder 10 and the shaft 3 and between the rectifier 13 and the shaft 3 towards the rotor 6, and a portion of the heat generated in the outboard bearing 30 is dissipated from the outboard bearing box 2a. Then, the air is deflected centrifugally by the internal fan 25, cools second coil ends of the stator winding 7a, and is then expelled through the second outboard ventilation apertures 2c.

Moreover, heat generated in the negative-side diodes 44 is transferred from the negative-side heat sink 41 to the outboard bracket 2, and heat generated in the outboard bearing 30 is also transferred to the outboard bracket 2. The heat transferred to the outboard bracket 2 is dissipated from a surface of the outboard bracket 2, and is also exchanged between the heat-dissipating ribs 2d and the cooling air flow expelled through the second outboard ventilation apertures 2c.

In addition, a cooling air flow flows from the inboard side to the outboard side as a result of pressure differences inside the brackets 1 and 2, cooling the field coil 22 of the rotor 6.

Heat-generating parts such as the stator 7, the rotor 6, the rectifier 13, and the voltage regulator 20 are cooled by these cooling air flows. The inboard and outboard bearings 4 and 30 are also cooled by these cooling air flows.

According to Embodiment 1 of the present invention, the outboard bearing 30 is constituted by a multi-row bearing having the cylindrical inner ring 31 and the cylindrical outer ring 32 forming a pair, two ball tracks 33 disposed axially between the inner ring 31 and the outer ring 32, and a plurality of balls 34 disposed in each of the ball tracks 33.

Thus, the radial load due to the tension applied to the belt and the load due to the weight of the rotor 6 applied to the outer ring 32 is divided equally among the ball tracks. Thus, the concentrated load is reduced, suppressing the occurrence of fatigue failure in the inner ring 31, the outer ring 32, and the balls 34, thereby enabling bearing life to be extended.

Because the concentrated load applied to the outer ring 32 is reduced, the outboard bearing 30 can be reduced in size, ensuring insulation distance between the rectifier 13 and the outboard bearing box 2a without increasing the size of the alternator, and enabling the sizes of the first outboard ventilation apertures 2b, the rectifier 13, and the voltage regulator 20 to be increased. If the first outboard ventilation apertures 2b are enlarged, the cooling air flow rate is increased, enabling the cooling performance of the alternator to be raised. If the sizes of the rectifier 13 and the voltage regulator 20 are increased, the surface area (heat-dissipating area) of the heat sinks 40, 41, and 21, which are heat exchange portions, can be increased, enabling temperature increases in the rectifier 13 and the voltage regulator 20 to be suppressed. As a result, because temperature increases are suppressed in the alternator, output can be improved, and deterioration in the life of component parts due to heat degradation can be suppressed.

The outboard bearing 30 is constituted by a multi-row bearing having two ball tracks 33. Thus, because the ball-tracks can be simultaneously machined, precision such as the coaxiality of the two ball tracks can be improved, and the balls 34 can be selected and incorporated in advance so as to minimize differences in radial clearance between the rows. As a result, because imbalances in the load shared between the rows can be reduced, bearing life can be lengthened significantly compared to when two single-row bearings are lined up.

When two single-row bearings are lined up, the space contained between the seals between the bearings is unusable, but in a multi-row bearing, since all of the space between the tracks can be used as a grease trap, axial length can be shortened compared to when two single-row bearings are lined up.

In addition, because the seals 35 are disposed at first and second ends of the space between the inner ring 31 and the outer ring 32, and lubricating oil is sealed in between the seals 35, sticking due to depletion of the lubricating oil is eliminated, enabling bearing life to be lengthened in this way also.

Because the outboard end surface 3a of the shaft 3 is positioned between the outboard end surface 30a of the outboard bearing 30 and the center line 33a of an outermost ball track 33 at the outboard end, the load is applied uniformly to the balls 34 in both rows, reducing imbalances in the load shared between the rows. Because the shaft 3 does not project outwards from the outboard bearing 30, assembly is improved.

Because the diameter A of the outer ring 32 of the outboard bearing 30 generally matches the diameter B of the slip rings 8, accidents can be prevented such the brush holder 10 being damaged by the outboard bearing 30 catching on the brushes 9 when the shaft 3 is pulled out of the outboard bearing box 2a together with the outboard bearing 30 in order to change worn brushes 9.

Embodiment 2

Figure 6:
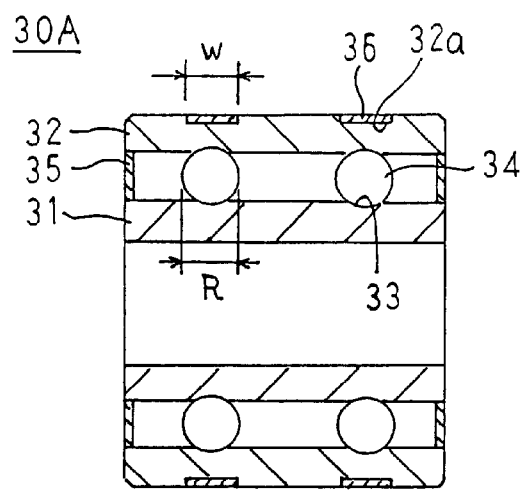
FIG. 6 is a longitudinal section of a construction of an outboard bearing in an automotive alternator according to Embodiment 2 of the present invention.

As shown in FIG. 6, in an outboard bearing 30A according to Embodiment 2, ring-shaped recessed grooves 32a are disposed in an outer circumferential surface of the outer ring 32 so as to face each of the ball tracks 33, and resin bands 36 collectively functioning as a creep-preventing member are mounted into each of the recessed grooves 32a. A width w of the resin bands 36 is formed so as to be less than or equal to a diameter R of the balls 34, and outer circumferential surfaces of the resin bands 36 are positioned on a common plane with the outer circumferential surface of the outer ring 32. Here, a polybutylene terephthalate (PBT) resin, or a polyamide resin, etc., is used in the resin bands 36. Moreover, the rest of the construction is constructed in a similar manner to Embodiment 1 above.

In Embodiment 1 above, the outboard bearing box 2a is heated by the heat generated during operation of the automotive alternator, and the outboard bearing box 2a and the outboard bearing 30 expand due to the heat. Because the outboard bearing box 2a is composed of aluminum and the outboard bearing 30 is composed of carbon steel, the outboard bearing box 2a and the outboard bearing 30 expand in such a way that a gap arises between the outboard bearing box 2a and the outer ring 32 of the outboard bearing 30 as a result of a difference between the coefficients of thermal expansion of the two. Thus, the bonding strength between the outboard bearing box 2a and the outboard bearing 30 weakens, and eventually there is a risk that the outer ring 32 of the outboard bearing 30 will rotate together with the shaft, leading to a state in which the outboard bearing box 2a is excessively heated by friction between the outboard bearing box 2a and the outer ring 32, and the outer ring 32 slips (or creeps). Slippage of the outer ring 32 results in variations in the rotational axis of the rotor 6, giving rise to damaging accidents due to the rotor 6 striking the stator 7.

In Embodiment 2, because the resin bands 36 are disposed in the outer circumferential surface of the outer ring 32 so as to face and radially overlap each of the ball tracks 33, if the outboard bearing box 2a is heated by the heat generated during operation of the automotive alternator, the resin bands 36 expand more than the outboard bearing box 2a, ensuring good bonding strength between the outboard bearing box 2a and the outboard bearing 30A. Thus, the outboard bearing box 2a is prevented in advance from being excessively heated by friction between the outboard bearing box 2a and the outer ring 32 due to the outer ring 32 of the outboard bearing 30A rotating together with the shaft, thereby preventing collisions between the rotor 6 and the stator 7.

Because the resin bands 36 are disposed in the outer circumferential surface of the outer ring 32 so as to face and radially overlap each of the ball tracks 33, the resin bands 36 expand above a contact portion between the balls 34 and the outer ring 32, reliably ensuring good bonding strength between the outboard bearing box 2a and the outboard bearing 30A.

Because the creep-preventing member is composed of the resin bands 36, manufacturing is easy and inexpensive.

Embodiment 3

Figure 7:
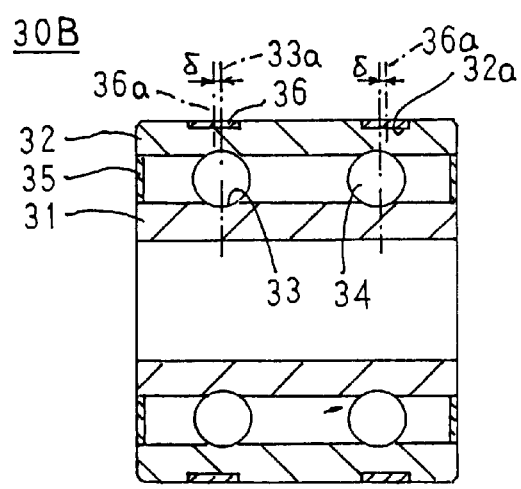
FIG. 7 is a longitudinal section of a construction of an outboard bearing in an automotive alternator according to Embodiment 3 of the present invention.

As shown in FIG. 7, in Embodiment 3, the resin bands 36 are disposed so as to radially overlap the corresponding ball tracks 33 such that width-direction center lines 36a of the resin bands 36 are offset (δ>0) towards end surfaces of an outboard bearing 30B relative to their respective ball track center lines 33a. Moreover, the rest of the construction is constructed in a similar manner to Embodiment 2 above.

According to Embodiment 3, because the width-direction center lines 36a of the resin bands 36 are offset towards the end surfaces of the outboard bearing 30B relative to the ball track center lines 33a, good bonding strength between the outboard bearing box 2a and the outboard bearing 30B is reliably ensured, preventing slippage of the outboard bearing 30B.

Embodiment 4

Figure 8:
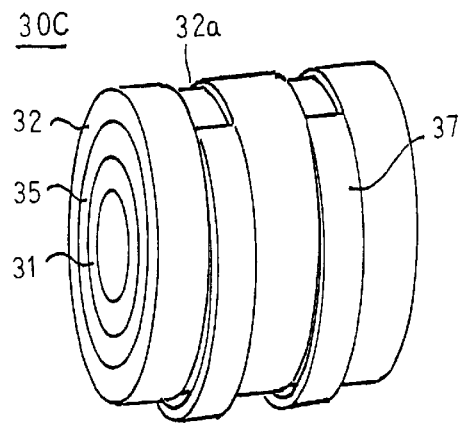
FIG. 8 is a perspective of an outboard bearing in an automotive alternator according to Embodiment 4 of the present invention.

As shown in FIG. 8, in Embodiment 4, metal rings 37 collectively functioning as a creep-preventing member are mounted into the recessed grooves 32a. These metal rings 37 are prepared from a spring material, are formed into a C shape having an inside diameter greater than an outside diameter of the recessed grooves 32a, and when an outboard bearing 30C is mounted in the outboard bearing box 2a, the metal rings 37 deform elastically so as to lie along bottom surfaces of the recessed grooves 32a, and are disposed in a compressed state between the outboard bearing box 2a and the recessed grooves 32a of the outer ring 32. Moreover, the rest of the construction is constructed in a similar manner to Embodiment 2 above.

In Embodiment 4, if the outboard bearing box 2a is heated by the heat generated during operation of the automotive alternator, the metal rings 37 return to their original state following the thermal expansion of the outboard bearing box 2a, in other words, so as to fit the gap arising between the outboard bearing box 2a and the outer ring 32, and the compressed state of the metal rings 37 between the outboard bearing box 2a and the outer ring 32 is maintained. Thus, because good bonding strength between the outboard bearing box 2a and the outboard bearing 30 is ensured, similar effects to those in Embodiment 2 above can also be achieved in Embodiment 4.

Embodiment 5

Figure 9:
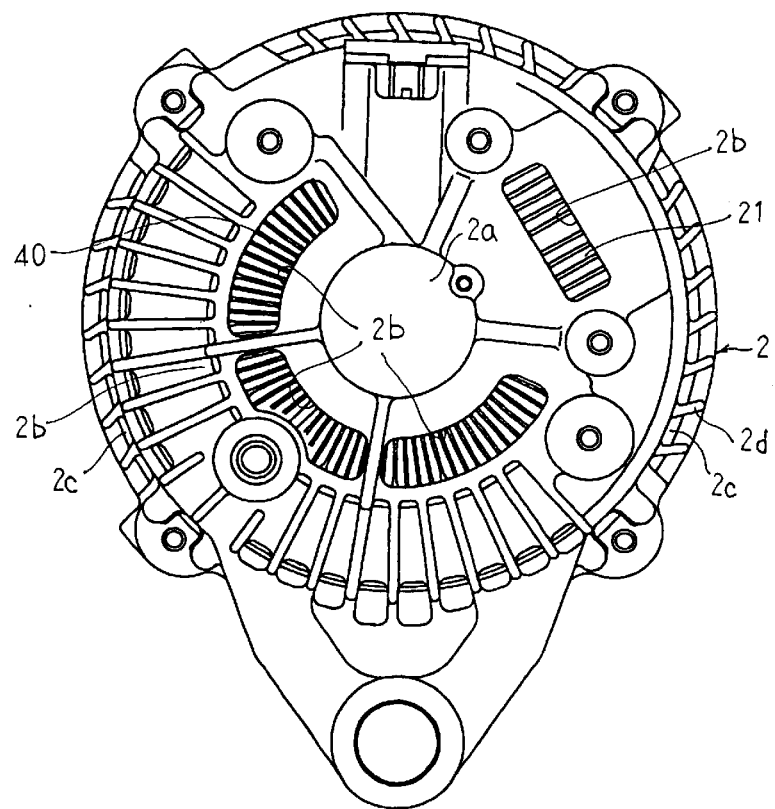
FIG. 9 is an outboard end elevation of an automotive alternator according to Embodiment 5 of the present invention.
Figure 10:
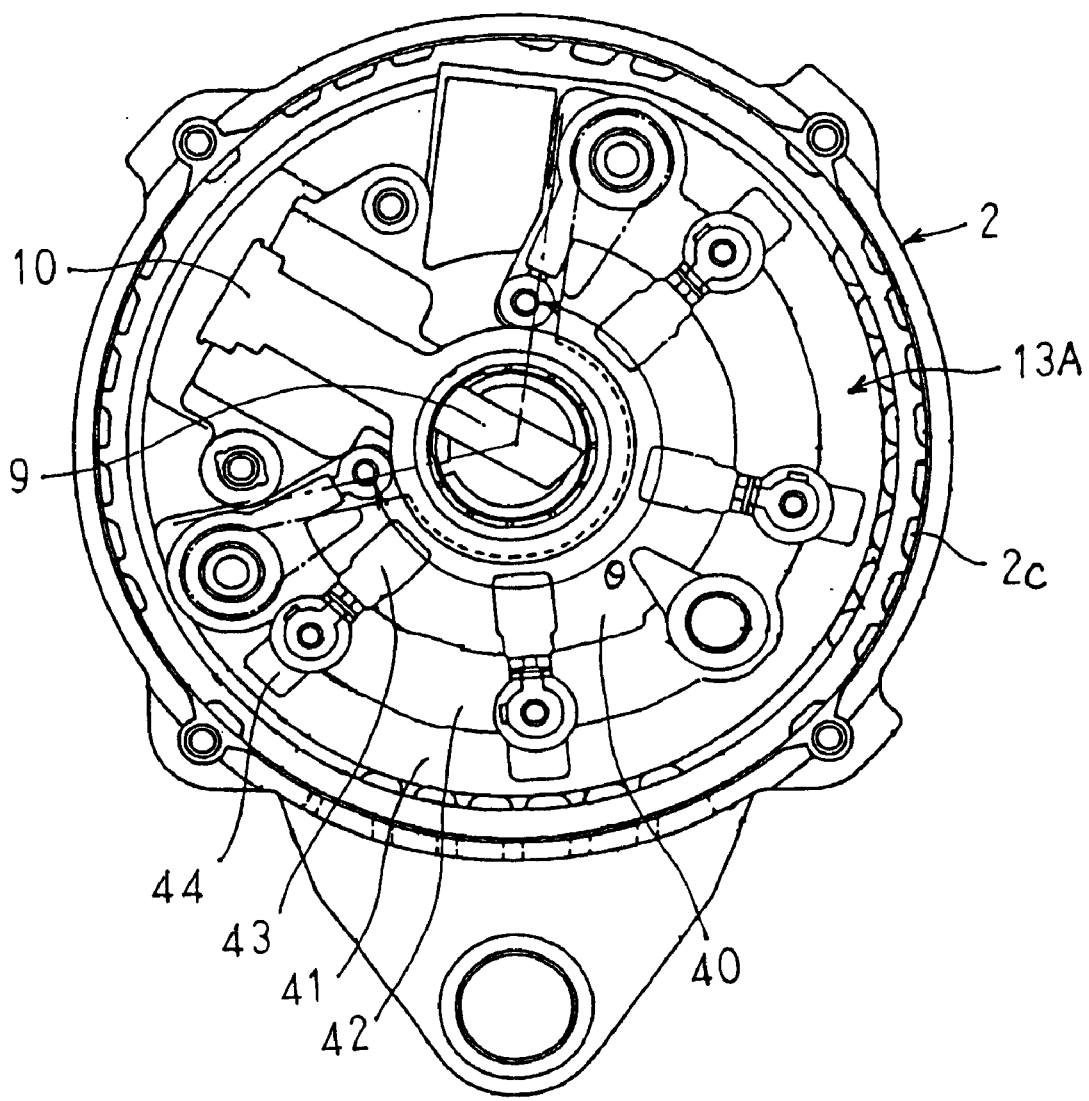
FIG. 10 is an interior view of an outboard end of the automotive alternator according to Embodiment 5 of the present invention.

As shown in FIGS. 9 and 10, in Embodiment 5, a rectifier 13A is constructed in an arc shape having a central angle θ of 180 degrees or more and is disposed on a common axis with the outboard bearing 30, and first outboard ventilation apertures 2b are bored through the outboard bracket 2 so as to open in an arc shape for half a circumference or more in a circumferential direction facing the rectifier 13A. Except for the fact that the central angle θ of the arc shape is 180 degrees or more, this rectifier 13A is constructed in a similar manner to the rectifier 13 in Embodiment 1 above, and is disposed so as to overlap the outboard bearing 30 in a radial direction. Moreover, the rest of the construction is constructed in a similar manner to Embodiment 1 above.

In Embodiment 5, because the size of the rectifier 13A is enlarged, the surface area (heat-dissipating area) of the positive-side heat sink 40 is increased, efficiently dissipating heat generated in the rectifier 13A. Because the size of the first outboard ventilation apertures 2b is also enlarged, the flow rate of the cooling air is increased, further improving cooling of the automotive alternator. As a result, because temperature increases are suppressed in the alternator, output can be improved, and deterioration in the life of component parts due to heat degradation can be suppressed.

In a construction like this, because the rectifier is disposed to surround a larger portion of the outer circumferential side of the outboard bearing, mutual thermal influence is great, and it is ideal for the above-mentioned multi-row bearings of the present invention.

Embodiment 6

Figure 11:
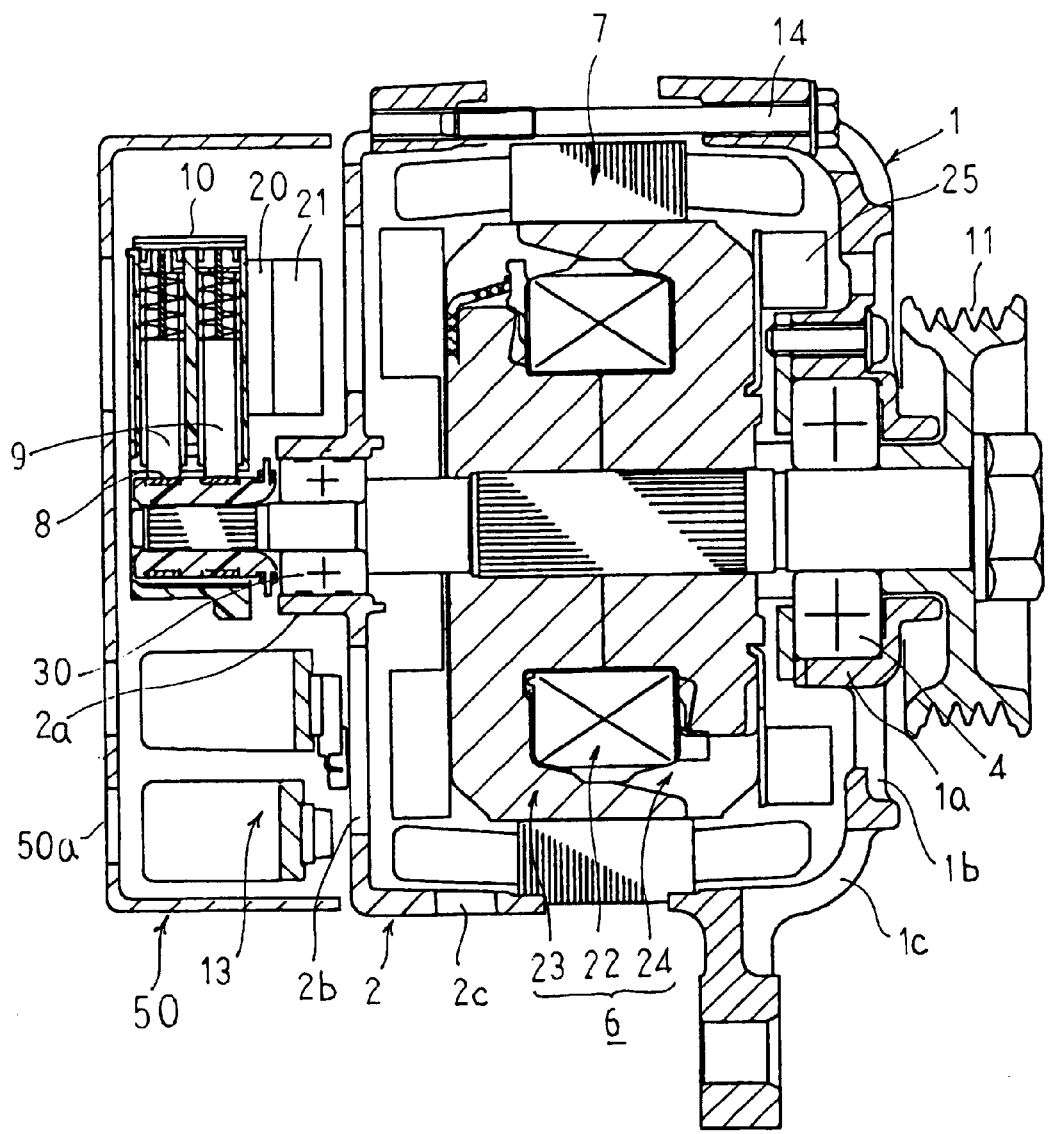
FIG. 11 is a longitudinal section of an automotive alternator according to Embodiment 6 of the present invention.

As shown in FIG. 11, in Embodiment 6, an outboard end portion of the shaft 3 is extended outwards from the outboard bearing 30, and the slip rings 8 are mounted to the extended portion of the shaft 3. The rectifier 13 and the voltage regulator 20 are disposed outside the outboard bracket 2 and around an outer circumference of the outboard bearing 30. In addition, a bracket cover 50 is mounted to the outboard bracket 2 so as to cover the brush holder 10, the rectifier 13, and the voltage regulator 20. Moreover, the rest of the construction is constructed in a similar manner to Embodiment 1 above.

In Embodiment 6, when the outboard internal fans 25 are rotated and driven together with the rotation of the shaft 3, at the outboard end, external air flows into the bracket cover 50 through ventilation apertures 50a of the bracket cover 50 and flows radially inwards along the positive-side heat sink 40 of the rectifier 13 and the regulator heat sink 21 on the voltage regulator 20. Thus, the heat generated in the positive-side diodes 43 and the voltage regulator 20 is dissipated from the positive-side heat sink 40 and the regulator heat sink 21. The cooling air then flows into the outboard bracket 2 through the first outboard ventilation apertures 2b, which are disposed around the outer circumference of the outboard bearing box 2a, towards the rotor 6, and a portion of the heat generated in the outboard bearing 30 is dissipated from the outboard bearing box 2a. Then, the air is deflected centrifugally by the internal fans 25, cools the second coil end of the stator winding 7a, and is then expelled through the second outboard ventilation apertures 2c.

Moreover, the cooling air flow at the inboard end is similar to that in Embodiment 1 above.

Heat-generating parts such as the stator 7, the rotor 6, the rectifier 13, and the voltage regulator 20, and the inboard and outboard bearings 4 and 30 are cooled by these cooling air flows.

Thus, similar effects to those in Embodiment 1 above can also be achieved in Embodiment 6.

Embodiment 7

Figure 12:
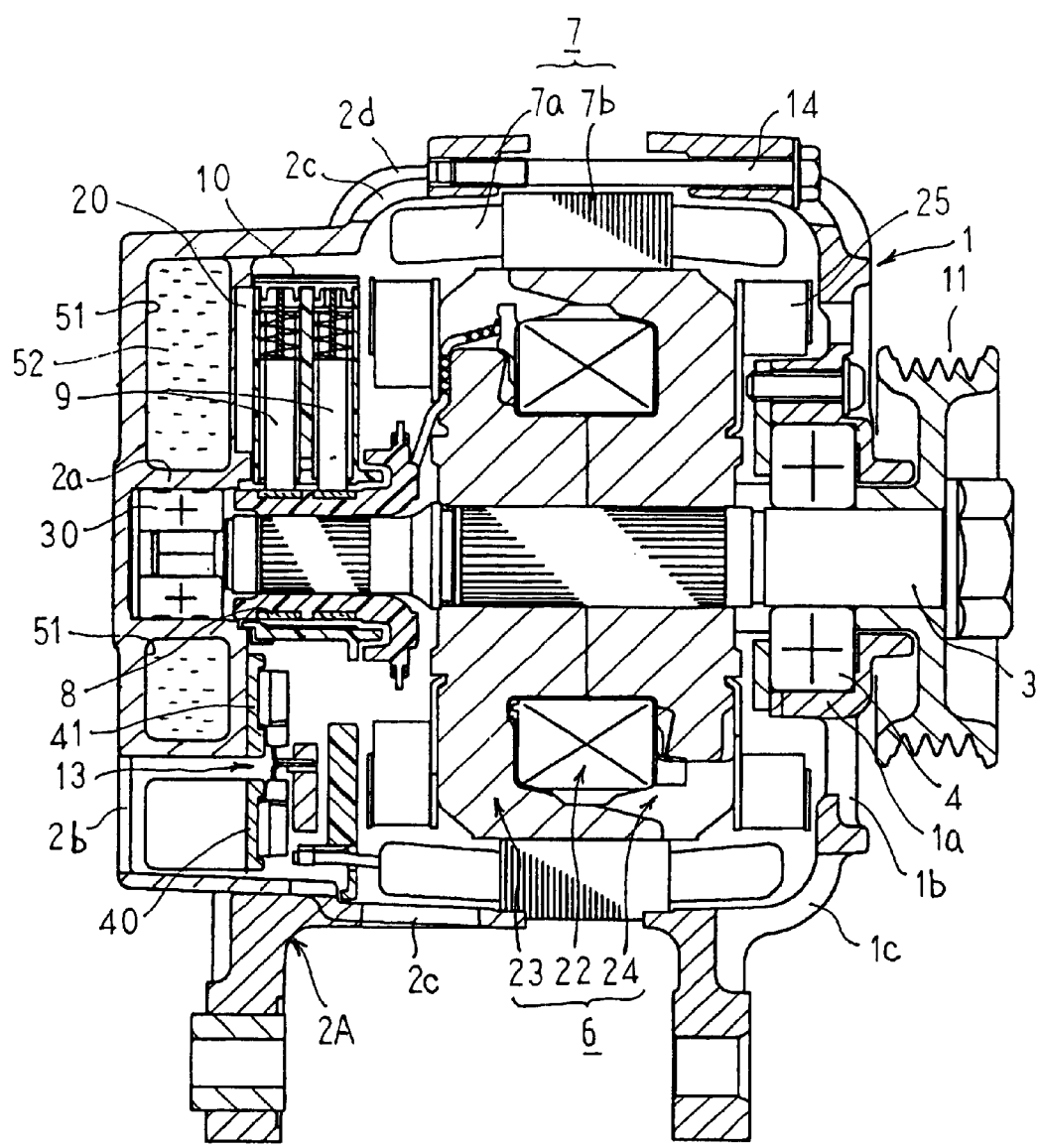
FIG. 12 is a longitudinal section of an automotive alternator according to Embodiment 7 of the present invention.
Figure 13:
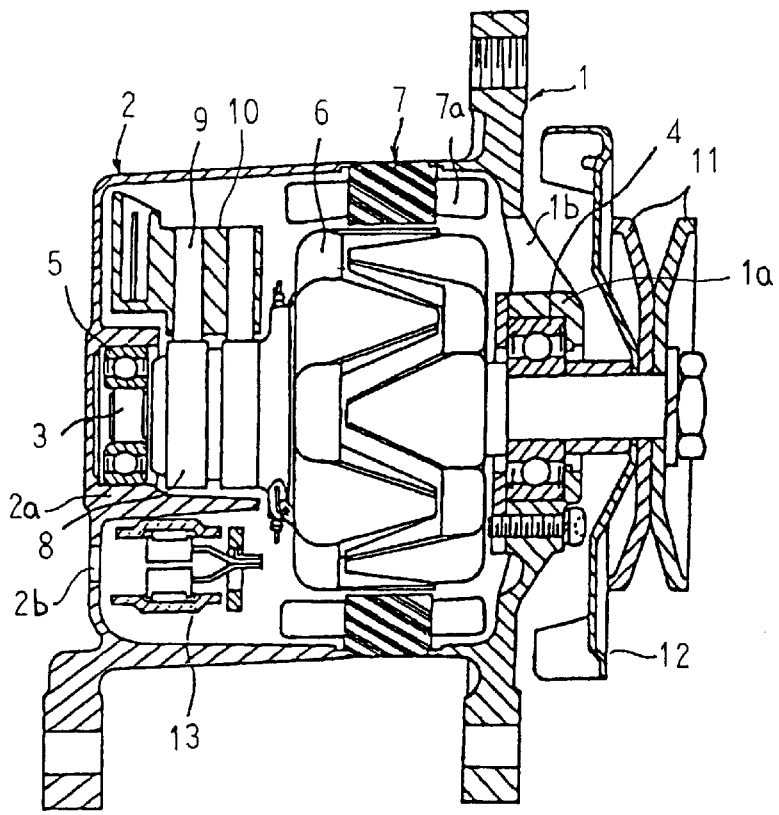
FIG. 13 is a longitudinal section of a conventional automotive alternator.
Figure 14:
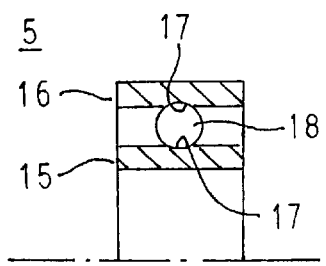
FIG. 14 is a partial cross section of a construction of an outboard bearing used in a conventional automotive alternator.

As shown in FIG. 12, in Embodiment 7, a distribution channel 51 for distributing cooling water 52 is disposed in a fluid-tight state inside an outboard bracket 2A. Here, the distribution channel 51 and the cooling water 52 constitute a heat dissipation means. Moreover, the rest of the construction is constructed in a similar manner to Embodiment 1 above.

In Embodiment 7, because the distribution channel 51 for the cooling water 52 is disposed in the outboard bracket 2A, heat generated in the negative-side diodes 44 is transferred from the negative-side heat sink 41 to the outboard bracket 2A, and heat generated in the voltage regulator and heat generated in the outboard bearing 30 are also transferred to the outboard bracket 2A, and this heat is absorbed into the cooling water 52 flowing through the distribution channel 51.

Consequently, according to Embodiment 7, temperature increases in the rectifier 13, the voltage regulator 20, and the outboard bearing 30 are suppressed.

Since the distribution channel is formed so as to cover an outer circumference of the outboard bearing, the multi-row bearings of the present invention are ideal because the distribution channel can be made larger.

Moreover, in each of the above embodiments, the present invention has been explained assuming that a multi-row bearing having two ball tracks is used for the outboard bearing, but the multi-row bearing is not limited to having two ball tracks; it may be a multi-row bearing having three or more ball tracks.

In each of the above embodiments, the present invention has been assumed to apply to an automotive alternator of a type in which the rotor has a field winding, but similar effects can be achieved even if the present invention is applied to a brushless type automotive alternator in which a field winding is secured to a bracket and a rotating magnetic field is supplied through an air gap to a stator.

The present invention is constructed in the above manner and exhibits the effects described below.

According to one aspect of the present invention, there is provided an automotive alternator including:

an inboard bracket formed in a bowl shape having a cylindrical inboard bearing box in a central portion of an end surface, and an outboard bracket formed in a bowl shape having a cylindrical outboard bearing box in a central portion of an end surface, the brackets being joined with open portions of the bowl shapes facing each other;

a shaft rotatably supported in the inboard and outboard brackets by means of inboard and outboard bearings disposed inside the inboard and outboard bearing boxes;

a pulley fixed to an inboard end portion of the shaft;

a stator disposed such that first and second ends thereof are supported in the inboard and outboard brackets;

a rotor fixed to the shaft, the rotor being disposed radially inside the stator;

a rectifier disposed in the outboard bracket on an outer circumferential side of the outboard bearing box; and a heat exchange portion for dissipating heat generated in the rectifier, wherein the outboard bearing is constituted by a multi-row bearing having one inner ring and one outer ring, a plurality of ball tracks disposed axially between the inner ring and the outer ring, and a plurality of balls disposed in each of the ball tracks, whereby the load bearing on the outer ring is distributed plurally in an axial direction, improving load-bearing properties without increasing the size of the outboard bearing. As a result, because the size of the outboard bearing can be reduced while ensuring the durability thereof, the area of the heat exchange portion can be increased. Thus, because cooling efficiency is improved and temperature increases in the outboard bearing and the rectifier are suppressed, an automotive alternator can be provided which enables the suppression of reductions in output and deterioration in working life as a result of temperature increases in the alternator.

According to another aspect of the present invention, there is provided an automotive alternator including:

an inboard bracket formed in a bowl shape having a cylindrical inboard bearing box in a central portion of an end surface, and an outboard bracket formed in a bowl shape having a cylindrical outboard bearing box in a central portion of an end surface, the brackets being joined with open portions of the bowl shapes facing each other;

a shaft rotatably supported in the inboard and outboard brackets by means of inboard and outboard bearings disposed inside the inboard and outboard bearing boxes;

a pulley fixed to an inboard end portion of the shaft;

a stator disposed such that first and second ends thereof are supported in the inboard and outboard brackets;

a rotor fixed to the shaft, the rotor being disposed radially inside the stator;

a rectifier disposed in the outboard bracket on an outer circumferential side of the outboard bearing box; and a ventilation aperture bored through the outboard bracket on an outer circumferential side of the outboard bearing box, the automotive alternator being constructed such that the rectifier is cooled by allowing air to flow through the ventilation aperture, wherein the outboard bearing is constituted by a multi-row bearing having one inner ring and one outer ring, a plurality of ball tracks disposed axially between the inner ring and the outer ring, and a plurality of balls disposed in each of the ball tracks, whereby the load bearing on the outer ring is distributed plurally in an axial direction, improving load-bearing properties without increasing the size of the outboard bearing. As a result, because the size of the outboard bearing can be reduced while ensuring the durability thereof, the area of the rectifier and the ventilation aperture can be increased. Thus, because cooling efficiency is improved and temperature increases in the outboard bearing and the rectifier are suppressed, an automotive alternator can be provided which enables the suppression of reductions in output and deterioration in working life as a result of temperature increases in the alternator.

The rectifier may be constructed in an arc shape having a central angle of 180 degrees or more and may be disposed on a common axis with the outboard bearing so as to overlap the outboard bearing in a radial direction, and the ventilation aperture may be bored through the outboard bracket so as to open in an arc shape for half a circumference or more in a circumferential direction facing the rectifier, increasing the heat dissipation area of the rectifier and the flow rate of the cooling air flowing in through the ventilation aperture, thereby effectively cooling the rectifier and the outboard bearing.

Slip rings for supplying a field current to a field winding in the rotor may be disposed at an outboard end of the shaft, a diameter of the multi-row bearing and a diameter of the slip rings being constructed so as to be substantially equal, whereby the outboard bearing no longer catches on the brushes during the operation of changing worn brushes, thereby suppressing accidents which damage the brush holder.

The shaft may be supported in the multi-row bearing such that an outboard end surface of the shaft is positioned between an outboard end surface of the multi-row bearing and a center line of an outermost ball track at the outboard end, whereby load is applied uniformly to each row of balls, reducing imbalances in the load shared among the rows.

A creep-preventing member may be disposed on an outer circumferential surface of the outer ring of the multi-row bearing facing the ball tracks, improving creep resistance.

The multi-row bearing may have two ball tracks, and the creep-preventing member may be formed into ring-shaped bodies having a width which is less than or equal to a diameter of the balls disposed in the ball tracks, the ring-shaped bodies being disposed on an outer circumferential surface of the outer ring facing each of the ball tracks such that width-direction center lines of the ring-shaped bodies are offset towards end surfaces of the multi-row bearing relative to center lines of the ball tracks, improving the creep-preventing effect.

The outboard bracket may be made of a metal, and the creep-preventing member may be made of a resin, increasing the creep-preventing effect and improving productivity.

A heat dissipation means may be disposed in the outboard bracket, whereby heat generated in the outboard bearing is efficiently dissipated, suppressing temperature increases in the outboard bearing.

What is claimed is:

1. An automotive alternator comprising:
    an inboard bracket formed in a bowl shape having a cylindrical inboard bearing box in a central portion of an end surface, and an outboard bracket formed in a bowl shape having a cylindrical outboard bearing box in a central portion of an end surface, said brackets being joined with open portions of said bowl shapes facing each other;
    a shaft rotatably supported in said inboard and outboard brackets by means of inboard and outboard bearings disposed inside said inboard and outboard bearing boxes;
    a pulley fixed to an inboard end portion of said shaft;
    a stator disposed such that first and second ends thereof are supported in said inboard and outboard brackets;
    a rotor fixed to said shaft, said rotor being disposed radially inside said stator;
    a rectifier disposed in said outboard bracket on an outer circumferential side of said outboard bearing box; and
    a heat exchange portion for dissipating heat generated in said rectifier,
    wherein said outboard bearing is constituted by a multi-row bearing having one inner ring and one outer ring, two ball tracks disposed axially between said inner ring and said outer ring, and a plurality of balls disposed in each of said ball tracks, and
    creep-preventing members formed into ring-shaped bodies each having a width which is approximately equal to a diameter of said balls are disposed on an outer circumferential surface of said outer ring facing said ball tracks such that width-direction center lines of said ring-shaped bodies are offset towards end surfaces of said multi-row bearing related to center lines of said ball tracks, respectively.

2. The automotive alternator according to claim 1, further comprising slip rings for supplying a field current to a field winding in said rotor disposed at an outboard end of said shaft, wherein a diameter of said multi-row bearing and a diameter of said slip rings are constructed so as to be substantially equal.

3. The automotive alternator according to claim 1 wherein said shaft is supported in said multi-row bearing such that an outboard end surface of said shaft is positioned between an outboard end surface of said multi-row bearing and a center line of an outermost ball track at said outboard end.

4. The automotive alternator according to claim 1 wherein:
    said outboard bracket is made of a metal; and
    said creep-preventing member is made of a resin.

5. The automotive alternator according to claim 1 wherein a heat dissipation means is disposed in said outboard bracket.

6. An automotive alternator comprising:
    an inboard bracket formed in a bowl shape having a cylindrical inboard bearing box in a central portion of an end surface, and an outboard bracket formed in a bowl shape having a cylindrical outboard bearing box in a central portion of an end surface, said brackets being joined with open portions of said bowl shapes facing each other;
    a shaft rotatably supported in said inboard and outboard brackets by means of inboard and outboard bearings disposed inside said inboard and outboard bearing boxes;
    a pulley fixed to an inboard end portion of said shaft;
    a stator disposed such that first and second ends thereof are supported in said inboard and outboard brackets;
    a rotor fixed to said shaft, said rotor being disposed radially inside said stator;

a rectifier disposed in said outboard bracket on an outer circumferential side of said outboard bearing box; and a ventilation aperture bored through said outboard bracket on an outer circumferential side of said outboard bearing box, wherein said automotive alternator is constructed such that said rectifier is cooled by allowing air to flow through said ventilation aperture, said outboard bearing is constituted by a multi-row bearing having one inner ring and one outer ring, two ball tracks disposed axially between said inner ring and said outer ring, and a plurality of balls disposed in each of said ball tracks, and creep-preventing members formed into ring-shaped bodies each having a width which is approximately equal to a diameter of said balls are disposed on an outer circumferential surface of said outer ring facing said ball tracks such that width-direction center lines of said ring-shaped bodies are offset towards end surfaces of said multi-row bearing related to center lines of said ball tracks, respectively.

7. The automotive alternator according to claim 6 wherein:

said rectifier is constructed in an arc shape having a central angle of 180 degrees or more and is disposed on a common axis with said outboard bearing so as to overlap said outboard bearing in a radial direction; and said ventilation aperture is bored through said outboard bracket so as to open in an arc shape for half a circumference or more in a circumferential direction facing said rectifier.

8. The automotive alternator according to claim 6, further comprising slip rings for supplying a field current to a field winding in said rotor disposed at an outboard end of said shaft, wherein a diameter of said multi-row bearing and a diameter of said slip rings are constructed so as to be substantially equal.

9. The automotive alternator according to claim 6 wherein said shaft is supported in said multi-row bearing such that an outboard end surface of said shaft is positioned between an outboard end surface of said multi-row bearing and a center line of an outermost ball track at said outboard end.

10. The automotive alternator according to claim 6 wherein:

said outboard bracket is made of a metal; and said creep-preventing member is made of a resin.

11. The automotive alternator according to claim 6 wherein a heat dissipation means is disposed in said outboard bracket.

* * * * *